United States Patent [19]

Sharkey et al.

[11] Patent Number: 4,654,144

[45] Date of Patent: Mar. 31, 1987

[54] PROCESS FOR THE DESTRUCTION OF NOXIOUS GASES WITH OZONE

[75] Inventors: Hubert J. Sharkey, Cincinnati; James A. Merritt, West Chester, both of Ohio

[73] Assignee: National Distillers and Chemical Corporation, New York, N.Y.

[21] Appl. No.: 825,128

[22] Filed: Feb. 3, 1986

[51] Int. Cl.$^4$ .................... C02F 1/78; B01D 53/34
[52] U.S. Cl. ................... 210/631; 210/760; 210/761; 210/916; 55/73; 423/242
[58] Field of Search ............... 210/916, 760, 761, 631, 210/909, 627; 55/73; 423/242

[56] References Cited

U.S. PATENT DOCUMENTS 4,203,838  5/1980  Shimizu et al. .................... 210/761
4,214,887  7/1980  van Gelder ........................ 210/760

FOREIGN PATENT DOCUMENTS 53-42438  4/1978  Japan ................................. 210/916
55-29723  8/1980  Japan ................................. 210/220
2034684   3/1980  United Kingdom ............... 210/761

OTHER PUBLICATIONS

Nebel C. et al.; "Industrial Odor Control by Oxidation with Ozone"; Proc. of the 30th Ind. Waste Conf. Purdue Univ.; pp. 1026–1035 (1975).

Primary Examiner—Benoit Castel
Attorney, Agent, or Firm—Kenneth D. Tremain; Gerald A. Baracka

[57] ABSTRACT

An improved process for the wet oxidation of malodorous gases obtained from sewage sludge drying operations is provided. Organic-enriched water having an oxygen demand of at least 5 mg per liter is utilized for the process.

8 Claims, No Drawings

PROCESS FOR THE DESTRUCTION OF NOXIOUS GASES WITH OZONE

BACKGROUND OF THE INVENTION

1. Field of the Invention:

The present invention relates to an improved wet oxidation process using ozone for the destruction of noxious gases obtained from sewage sludge drying operations.

2. Description of the Prior Art:

The use of ozone for the control of odors generated by various industrial operations is well known. For example, ozone has been utilized for odor control in distilleries, breweries, paper mills, chemical manufacturing facilities, wastewater treatment facilities, rendering plants, fish processing plants, and the like.

One method of treatment is the so-called "direct injection" method wherein ozone is injected directly into the odor-laden gas and contacted therewith using a suitable gas-gas contactor. The amount of ozone required and contact time varies depending primarily on the nature and concentration of the malodorous contaminants. While the direct injection technique is useful for the deodorization of readily oxidizable contaminants present in relatively low concentrations, it is not totally effective where high concentrations of odorants and/or organic odorants which are difficultly oxidizable are present. The "wet oxidation" process has proven to be much more effective and desirable for the treatment of gases of the latter type.

Wet oxidation processes involve contacting the odor-laden gases with ozone in the presence of water. Typically this is accomplished by contacting the waste gas with recirculating water which is saturated or essentially saturated with ozone. Typical wet oxidation procedures are described by D. L. B. Arnold, Chem. Ind. (London), 1974(22), 899–902 and R. Anderson and G. F. Greaves, Water Pollution Control (Maidstone, England), 82(1), 18–20(1983). Because of the higher dosage of ozone possible and the more efficient contact obtained with the wet oxidation (gas-liquid) process, it is considerably more effective than gas-gas contact methods for the treatment of noxious gases containing relatively high concentrations of malodorous organic materials. The wet oxidation method has therefore been widely accepted for use for the chemical oxidation of odors emanating from sewage sludge treatment operations since such gases typically have high concentrations of highly objectionable putrid organic nitrogen- and sulfur-containing substances, particularly skatole, methyl disulfide, dimethyl sulfide, methyl mercaptan, putrescine and cadavarine.

There are, however, two problems associated with the use of the wet oxidation process for the treatment of gases obtained from sludge treatment operations. The first is the inability to consistently consume all of the ozone present in the system. An appreciable excess of ozone is typically utilized in the process to compensate for variations in the odorous gas and to obtain optimum oxidation. This often results in ozone "breakthrough," i.e., the presence of unreacted ozone in the deodorized gas. Since there are restrictions on the amount of residual ozone which can be vented to the atmosphere, scrubbers or some other ozone destruct means must therefore be provided. It would be highly advantageous if ozone breakthrough could be eliminated and the use of costly scrubbing/ozone destruct equipment avoided.

The other problem is the inability to completely eliminate secondary odors present in the exhaust gas. While the highly objectionable putrid odor is readily removed and undetectable after treatment, the treated exhaust gas still does not have the quality of fresh air. A persistent secondary odor, generally characterized and referred to herein as a "sweet sulfite" odor and believed to result from inorganic sulfite and alkyl sulfide partial oxidation products, is evident in the exhaust gas obtained from the prior art wet oxidation processes. It would be highly desirable if a process were available wherein the sweet sulfite odor was eliminated from the treated exhaust gas.

SUMMARY OF THE INVENTION

With the present improved process, the aforementioned problems heretofore associated with wet oxidation processes which utilize ozone for the treatment of malodorous gases obtained from sludge treatment operations are eliminated. Quite unexpectedly for the process of this invention, it has been discovered that if the water used in the process has a substantial oxygen demand it is possible to achieve and consistently maintain the high ozone dosages necessary to effect complete oxidation of the malodorous substances present in the gas stream without ozone breakthrough. It has also surprisingly been found that the persistent secondary sweet sulfite odor heretofore associated with gases treated in accordance with prior art wet oxidation procedures is eliminated with the process of this invention.

For the process, malodorous gases obtained from sewage sludge treatment operations are intimately contacted with organic-enriched water and ozone. The water utilized in the process has an oxygen demand of at least 5 milligrams per liter. For continuous operation, the water is preferably utilized on a once-through, i.e., non-circulating, basis. Ozone concentrations ranging from about 3 to about 100 parts per million (ppm), based on the waste gas being treated, are utilized. In one embodiment of the invention, the malodorous gas being treated is the hot discharge gas from a sludge drying facility. In another embodiment, the organic-enriched water employed for the process is effluent from a sewage treatment operation.

DETAILED DESCRIPTION OF THE INVENTION

This invention relates to an improved process for eliminating obnoxious odors generated in sewage sludge heat treatment facilities.

The disposal of sewage sludge is a serious problem for most wastewater treatment facilities due to the large quantity of solids which are generated. It is expensive and virtually impossible to handle and acceptably dispose of the large volume of sludge, which typically have a volatiles content greater than about 70 percent, obtained from even a relatively small sewage treatment facility. Sludge drying operations are therefore being utilized in an increasing number of wastewater treatment plants. In the sludge drying operation, the recovered treated sewage solids are heated to remove water. The dried sludge is more easily handled and transported and is acceptable for use for agriculture purposes.

A number of different drying procedures can be employed to dry sludge. Basically, however, they all involve heating the solids at a temperature from about 100° C. up to about 300° C. and, more generally, from 150° C. to 250° C. until most of the water associated with the solids is eliminated. Heating is carried out in a suitable chamber or oven. A revolving kiln or kiln fitted with a rotating screw is most commonly utilized. Compressed air is generally introduced during the heating to facilitate removal of the water. While conditions and design of the equipment may vary, all of these sludge drying operations necessarily generate off-gases which are foul, putrid, and highly objectionable.

Numerous odorous nitrogen- and sulfur-containing substances, many of which have low odor and detection thresholds, are released/generated upon the heating and drying of solids obtained from wastewater treatment operations. These include simple inorganic compounds, primarily hydrogen sulfide, sulfur dioxide, and ammonia, and numerous organic substances. The principal odorous organic substances (osmogenes) found in wastewater and sludge are listed in Table 1-I of *Odor Control for Wastewater Facilities, Manual of Practice No. 22* prepared by the Task Force on Odor Control, Charles A. Parthum, Chairman.

Skatole (fecal, nauseating), putrescine (putrid, nauseating), and cadavarine (putrid, decaying flesh) are particularly offensive odor components present in the off-gases obtained from sludge drying operations. The elimination (destruction or other type of removal) of these highly objectionable odors from the exhaust gases which are vented to the atmosphere is essential for the successful continued operation of these types of facilities, particularly where they are located in densely populated areas.

Wet oxidation of malodorous off-gases obtained from various sewage treatment operations with ozone is widely utilized for odor removal. Such wet oxidation procedures are described in the prior art by D. L. B. Arnold, *Chem. Ind. (London)*, 1974(22), 899–902; R. Anderson and G. F. Greaves, *Water Pollution Control* (Maidstone, England), 82(1), 18–20(1983); R. Kasthuri, *Control of Odours and Noise in the Process Industries*, 1978, 49–57; and in *Umweltschutz -Gesundheitstechnik*, 12(11), 294–5(1978); details of which are incorporated herein by reference.

Most commonly, in the prior art processes, the foul-smelling gases are collected and contacted in a suitable contact chamber (scrubber) with water which has been injected with ozone and is saturated or essentially saturated therewith. Fans may be utilized, if necessary, to collect and direct the gases to the contact chamber. Conventional gas-liquid scrubbers wherein the malodorous off-gases are intimately contacted with water which is saturated or essentially saturated with ozone are employed. The water with dissolved ozone is introduced as a mist through a multiplicity of spray nozzles located throughout the contact chamber. Generally, the gas is introduced at or near the bottom of the scrubber and vented at the top. Multiple scrubbers may be utilized for more efficient gas-liquid contact. When two or more stages are used, the scrubbers are generally connected in series and may be of the same or different design. Contact times will vary depending on the number and design of the scrubber(s) and the volume of gas being treated. After contacting with ozone, the treated gases are vented to the atmosphere. Water used in the operation is circulated back to the scrubber. Additional ozone is added to the recirculated water before it is reintroduced into the scrubber.

An alternative approach is to mix the water containing the ozone with all or a portion of the odorous gas using an adjustable throat venturi. These treated gases may then be sprayed into a scrubber and further treated as described above or discharged through a sparge ring or the like into a separator.

Still another procedure is to introduce the ozone directly into the malodorous gas stream and to subsequently intimately contact with the water. Turbulent mixing in a venturi or other conventional mixing means wherein intimate gas-liquid contact is achieved is suitable for this purpose.

For the improved process of this invention, the water employed is organic enriched, that is, has a significant chemical oxygen demand. The oxygen demand of the water is at least 5 mg per liter and may range as high 300 mg per liter. Most generally, the oxygen demand of the water ranges from 5 to 50 mg per liter. In one embodiment of this invention, effluent water from a waste treatment facility meeting the above-defined oxygen demand requirements is used. These effluents can be primary, secondary, or tertiary discharges from sewage treatment operations.

The organic-enriched water is contacted with ozone and malodorous gases using conventional wet oxidation techniques known to the art. However, since it is necessary for the water to have a substantial chemical oxygen demand, the water is used on a one-time basis, i.e., when the oxygen demand drops below the specified level all or a portion of the water is discarded and replaced with water within the specified oxygen demand limits. It has quite unexpectedly been discovered that when organic-enriched water is employed it is possible to achieve and consistently maintain the high ozone dosages necessary to effect not only complete removal of the noxious primary odors but also to eliminate the secondary sweet sulfite odor which has heretofore been present in the vented gases obtained from wet oxidation processes. Moreover, this can be accomplished using higher doses of ozone than was heretofore possible without ozone breakthrough.

In a preferred embodiment of the invention, all or a portion of the water used in the process is continuously exchanged. It is particularly advantageous under such conditions of continuous water exchange, to utilize the water on a once-through basis, i.e., not to recirculate the water. In such an operation, water which has been contacted with the malodorous gas and ozone is discharged. The water is not recirculated and reused as is the customary practice of prior art wet oxidation processes.

Any ozone not utilized to oxidize malodorous materials present in the gas is consumed by reaction with the organic materials (osmogenes) present in the water, thus making it possible to employ higher dosages of ozone than was heretofore possible without undesirable ozone breakthrough. The presence of organic materials in the water does not, however, adversely affect oxidation of the osmogenes. In fact, oxidation of the osmogenes is enhanced because of the ability to dose the water with high concentrations of ozone. Also, due to the high ozone levels which can be utilized undesirable and troublesome secondary odors are minimized and, in most cases, completely eliminated so that the vented gases have a "fresh air" quality. A secondary benefit of the invention is the resulting improvement in the quality of the water used in the process. As a result of the contact with ozone, the organic content of the water is significantly reduced making it environmentally more acceptable for discharge.

With the present process, complete removal of both the primary (noxious) and secondary (sweet sulfite) odors is obtained utilizing as little as 3 ppm ozone (based on the volume of malodorous gas being treated). Ozone concentrations up to as high as 100 ppm can be used, depending on the oxygen demand of the water, without experiencing undesirable ozone breakthrough. Due to cost considerations, however, it is general practice to use the lowest concentration of ozone possible (allowing a slight excess to provide for variation in the gas composition) to obtain effective odor removal. Most generally, the ozone concentration ranges from 3 to 50 ppm.

To demonstrate the improved process of the invention, a series of experiments were conducted as described in the examples to follow. For these examples, malodorous gas vented from a sludge drying operation of a municipal waste-water treatment plant was used. The sludge drying operation utilized a direct flame kiln to dry the pressed sludge. The dried sludge was then passed through a cyclone where the solid pellets were separated from the water-saturated gases (180° F.) which were drawn off by a blower (20,000 CFM) and cooled to 110° F. by contacting with plant effluent (120 gallons/min.) before discharging through a 3 foot diameter stack. Gas used for the experiments was pulled from this stack through a 2" diameter pipe by a 200 CFM blower. Ozone (about 0.5% in oxygen) was used for all of the experiments and generated using an Emery Emerzone® Model EGS-100 ozone generator.

Gas pulled from the vent stack was piped through two-inch O.D. pipe into a gas-liquid contactor. The contactor consisted of a cylindrical metal vessel having a capacity of approximately 55 gallons. The vessel was lined with 40 mil thick polyethylene. Ozone/oxygen was injected into the gas stream through a $\frac{3}{8}$-inch aluminum tube which was screw-fitted into the inlet pipe. The inlet pipe also had a by-pass vent line. The contactor contained approximately 40 gallons effluent water (oxygen demand greater than 5 mg/l) obtained from the waste treatment facility. The incoming gas stream was intimately dispersed in the effluent water through a sparge pipe located at the bottom of the contactor (about 30 inches below the liquid surface). Before the ozone/oxygen mixture was introduced into the incoming gas stream the gas exiting the contactor was putrid and foul-smelling. Upon introduction of ozone, the quality of the exiting gases was immediately improved and at an ozone level of only 3.19 ppm (in the gas stream), the exiting gas after contact with the ozone and water was characterized as "clean", i.e., all of the putrid odors were removed and there was no evidence of the sweet sulfite odor heretofore associated with gases treated by wet oxidation procedures. The ozone concentration was increased up to about 12 ppm and the gas continued to have this "clean" quality. It was not until the ozone concentration reached 12.30 ppm when the first trace of ozone was detected in the vented gases.

For comparative purposes, the effluent water was replaced with potable (city) water (negligible oxygen demand) and the experiment was repeated. As in the previous case, before introduction of the ozone the gas exiting the contactor was putrid and nauseating. Upon introduction of ozone, the quality of the exiting gas was improved. At 2.97 ppm ozone the putrid odor was removed but there was a pronounced sweet sulfite odor associated with the gas. While the odor quality of the gas was further improved by increasing the concentration of the ozone to 6.47 ppm, the sweet sulfite odor was still present. Further attempts to increase the ozone level to completely eliminate the sweet sulfite odor were unsuccessful and eventually resulted in ozone breakthrough at 8.34 ppm ozone.

It is apparent from the above that while complete and effective odor removal is obtained with the process of this invention at ozone concentrations as low as about 3 ppm using water having a substantial oxygen demand, it is not possible to obtain completely acceptable results even with substantially higher concentrations of ozone when potable water having a negligible oxygen demand is used. It is also evident that when effluent water is employed in accordance with the present improved process that significantly higher concentrations of ozone can be tolerated in the system without ozone breakthrough, i.e., the ozone breakthrough threshold is raised.

Additional runs were carried out using the above-described procedure except that the effluent water used for these experiments had significantly higher oxygen demands. Ozone concentrations of 32.23 ppm, 33.26 ppm and 36.36 ppm were effectively utilized for these trials. In all events, the exiting gas was "clean" with no trace of ozone. It was not until significantly higher concentrations of ozone (50.63 ppm) were used that there was any evidence of ozone breakthrough. Variations were also made in the amount of water used for the process. In still other trials, the water was continuously exchanged at a rate sufficient to insure that the oxygen demand of the water was maintained at a level sufficiently above 5 mg/l and not depleted.

We claim:

1. In a process for the deodorization of malodorous gas from a sewage sludge drying operation wherein said gas is intimately contacted with water and ozone, to eliminate both primary and secondary odors and raise the ozone breakthrough threshold, the improvement which comprises utilizing water having an oxygen demand of at least 5 milligrams per liter.

2. The process of claim 1 wherein 3 to 100 ppm ozone, based on the malodorous gas, is utilized.

3. The process of claim 2 wherein the temperature of the malodorous gas ranges from ambient to 300° F.

4. The process of claim 3 wherein the water is effluent from a sewage treatment operation.

5. The process of claim 4 wherein the temperature of the malodorous gas ranges from 120° F to 250° F.

6. The process of claim 5 wherein 3 to 50 ppm ozone is employed and the water has an oxygen demand of 5 to 50 milligrams per liter.

7. The process of claim 6 wherein sufficient water is utilized to reduce the temperature of the exiting gas to 110° F. or below.

8. The process of claims 1, 2, 3, 4, 5, 6, or 7 which is carried out as a continuous operation and wherein the water is utilized on a once-through basis.

* * * * *